United States Patent
Sonderegger et al.

(10) Patent No.: US 7,991,273 B2
(45) Date of Patent: Aug. 2, 2011

(54) HEATED COUPLING

(75) Inventors: Sigurd Sonderegger, Askim (SE); Bengt Henström, Alingsås (SE)

(73) Assignee: Volvo Lastvagnar AB, Göteborg (SE)

( * ) Notice: Subject to any disclaimer, the term of this patent is extended or adjusted under 35 U.S.C. 154(b) by 446 days.

(21) Appl. No.: 12/096,049

(22) PCT Filed: Dec. 18, 2006

(86) PCT No.: PCT/SE2006/001439
§ 371 (c)(1),
(2), (4) Date: Jun. 4, 2008

(87) PCT Pub. No.: WO2007/073286
PCT Pub. Date: Jun. 28, 2007

(65) Prior Publication Data
US 2008/0271801 A1 Nov. 6, 2008

(30) Foreign Application Priority Data
Dec. 22, 2005 (SE) ...................................... 0502903

(51) Int. Cl.
*F24H 1/10* (2006.01)

(52) U.S. Cl. ....................................... 392/478; 392/465
(58) Field of Classification Search .................. 392/465, 392/468, 469, 472, 478, 479
See application file for complete search history.

(56) References Cited

U.S. PATENT DOCUMENTS

| | | | | |
|---|---|---|---|---|
| 2,793,280 A * | 5/1957 | Harvey | ......................... | 137/341 |
| 2,801,323 A * | 7/1957 | Heron | ........................... | 219/537 |
| 3,314,039 A * | 4/1967 | Opper | ........................... | 439/195 |
| 3,355,572 A * | 11/1967 | Chrow | ......................... | 392/468 |
| 3,378,673 A * | 4/1968 | Hopper | ........................ | 392/472 |
| 3,784,785 A * | 1/1974 | Noland | ........................ | 392/468 |
| 4,038,519 A * | 7/1977 | Foucras | ....................... | 392/472 |
| 4,447,707 A | 5/1984 | Baker | | |
| 4,455,474 A * | 6/1984 | Jameson et al. | .............. | 392/472 |
| 4,644,134 A * | 2/1987 | Baker | ........................ | 392/472 |
| 4,686,354 A * | 8/1987 | Makin | .......................... | 392/472 |
| 4,791,277 A * | 12/1988 | Montierth et al. | ............ | 219/535 |
| 4,874,925 A * | 10/1989 | Dickenson | .................... | 392/472 |
| 5,713,864 A * | 2/1998 | Verkaart | ...................... | 604/113 |
| 5,791,377 A * | 8/1998 | LaRochelle | .................... | 138/33 |
| 6,727,481 B1 * | 4/2004 | Wilds | ........................... | 219/549 |

FOREIGN PATENT DOCUMENTS

| | | |
|---|---|---|
| EP | 1433994 A1 | 6/2004 |
| JP | 11159685 A | 9/1999 |
| WO | 2005080850 A1 | 9/2005 |

OTHER PUBLICATIONS

International Search Report from corresponding International Application No. PCT/SE2006/001439.

* cited by examiner

*Primary Examiner* — Thor Campbell
(74) *Attorney, Agent, or Firm* — WRB-IP LLP

(57) ABSTRACT

Cabling for a motor vehicle includes at least one fluid hose, a first cable for heating the fluid hose and at least one electrical connector for connecting the cable to an electrical supply, and at least one hose connector for connecting the fluid hose to a cooperating connector means. The hose connector may be provided with an electrically heated device arranged to heat at least part of the hose connector.

19 Claims, 3 Drawing Sheets

HEATED COUPLING

BACKGROUND AND SUMMARY

The invention relates to electrically heated couplings, in particular couplings for cabling used in a vehicle.

A vehicle contains various types of containers or tanks containing liquids used for different purposes in the vehicle. There is often a need for maintaining such fluids above a certain temperature to ensure that the equipment using the fluid may be operated as intended. In some cases it is sufficient to add an anti-freeze to the liquid to prevent the liquid from freezing. In other cases the use of anti-freeze is not possible, as this can affect the functional properties of the liquid. In the latter cases the container or tank can be provided with a suitable heating device for melting the liquid if it freezes. The heating device can be activated before or during starting of the vehicle, depending on the ambient temperature and the volume of liquid to be melted. To ensure proper function of a system containing the liquid, hoses or cabling conveying the liquid to or from the tank must also be defrosted. This requires additional heating devices for melting any frozen liquid in the hose.

The present invention can be used in connection with heating of different types of hoses and cabling and is not limited for use in vehicles. In the subsequent text the invention will be described in connection with a particular implementation, namely heating of hoses used for conveying liquid urea, commercially available as AdBlue®. This liquid is a non-toxic aqueous urea solution used to chemically reduce nitrogen oxide (NOx) emissions, in particular for heavy-duty diesel powered vehicles. However, the invention is not limited to the heating of hoses for this purpose.

For commercial vehicles, cold starts should be possible in temperatures down to −400 C. Consequently it is also required that the exhaust purification system should perform satisfactorily at such temperatures. As urea is an aqueous solution that can not be mixed with, for instance, an alcohol based anti-freeze, there is a need for heating hoses conveying urea.

There are various ways of heating the fluid in a hose. One way is to heat the hose with the cooling water. This means that the heating is delayed until the engine has warmed up and that a number of extra hoses and connections are required for conveying water to multiple locations around the vehicle. This solution is both expensive and unnecessarily complicated.

A simpler way is to heat the hose using electricity. Hoses can be provided with electrical wiring comprising one or more wires that may be wound spirally around the inner conduit inside the material making up the hose. The electrical wiring may be incorporated between individual layers in the hose or be an integral part of the body of the hose. A problem with such known solutions is that heating is only provided for the hose itself.

In addition, there are particular types of commercial vehicles intended for the transportation of dangerous goods, for which special safety requirements apply. There are both national safety requirements, drawn up by many individual countries, as well as international agreements that regulate safety requirements at an international level. One such international agreement is "The European Agreement concerning the International Carriage of Dangerous Goods by Road", commonly referred to as ADR, first agreed in Geneva on the 30th of September 1957 under the auspices of UNECE. This agreement has since been updated.

The agreement regulates how dangerous goods are to be transported in goods vehicles by road. One of the requirements is that it must be possible to cut off the supply voltage of the vehicle while in motion. For example, when the ADR system detects a safety-related occurrence or in the event of an accident, the driver activates an emergency cut-off switch in the cab. In addition, the electrical cabling must be encapsulated. For certain vehicles, there are also requirements that the electrical cabling must fulfil the protection classification IP69K for wash down protection. One of the requirements for this protection classification is that all electrical cabling must be completely encapsulated. This encapsulation can be carried out using, for example, corrugated plastic hose.

Vehicles that are to be ADR-classified must usually be specially ordered with special equipment that ensures that the vehicle meets the requirements laid down. In order not to need to have to redesign the whole vehicle when an ADR-classified vehicle is to be manufactured, it is advantageous for as much as possible of the vehicle's standard equipment to meet the requirements of the ADR classification. This reduces the number of components, which simplifies the production. As an ADR-classified component is often more robust than a standard component, this is also advantageous for the quality of the vehicle.

Providing an ADR-classified vehicle with a fluid hose that is heated electrically is a difficult problem. As the fluid hose is required to be able to be connected and disconnected, releasable connectors must be provided for both the hose connectors and the electrical connectors. At the same time, all electrical cabling must be encapsulated so that all parts of the cable are protected.

There are several known arrangements for heating a hose for fluids. WO 2002/38426, EP 0 045 024 and DE 297 15 336 describe systems where a heating cable is located in the fluid conduit of the hose. A disadvantage is that such a solution can cause leakage at the connection points where the cable enters the hose. In addition, it is not desirable to immerse an electrical cable in urea or in fluids with corrosive properties.

U.S. Pat. No. 5,791,377, EP 0 616 166, EP 1 040 973 and DE 198 44 486 describe fluid hoses where the heating cable is integrated in the wall surrounding the fluid conduit of the hose. In these examples, the electrical leads are provided with some form of special electrical connector for connecting the electrical current, with the electrical connector also being attached to the hose itself. The disadvantage of these solutions is that they require an extra electrical connector. This is an expensive solution which is not particularly robust, as a relatively large electrical connector attached to a narrow hose is a mechanically unsatisfactory solution.

DE 3 900 821, EP 1 329 660, DE 198 44 485, DE 3 900 821 describe additional fluid hoses in which the heating cable is integrated in the wall of the hose. The connection of the heating cable can be carried out in a conventional way, which means that the heating cable is unprotected where it comes out of the hose. This solution is not suitable for use in a vehicle.

A common problem for the above prior art documents is that they only provide means for heating the hose itself. The connectors used for connecting the hose to a tank or to the equipment to be supplied with fluid may in some cases be protected from humidity and/or external forces, but are otherwise exposed to the surrounding environment.

It is therefore desirable to provide a connector for a fluid hose that is protected from humidity and external forces, as well as being provided with means for allowing operation in sub-zero ambient temperatures.

According to a preferred embodiment, the invention relates to a cabling for a motor vehicle, which cabling may comprise at least one fluid hose, a first cable for heating the fluid hose and at least one electrical connector for connecting the cable to an electrical supply. The cabling further comprises at least one hose connector for connecting the fluid hose to a cooperating connector means. In order to defrost or heat the hose connector it is provided with an electrically heated device that may be arranged to heat at least part of the hose connector. The heated device may be dimensioned to thaw a frozen hose connector in about one hour from −400 C or about half an hour from −20° C. The heated device may also be required to maintain the hose connector above a predetermined temperature during operation of a vehicle. Some form of temperature control may be required for this purpose. Various suitable heating devices are described below.

According to one embodiment the first electric cable used for heating the fluid hose is used to supply electric power to the electrically heated device. In this case, the first cable is preferably, but not necessarily, integrated in the fluid hose. The first cable may be connected to the electric supply at one end and may be provided with electrical connectors or electrical splicing devices for the electrically heated device at a second end.

The electrically heated device may be connected in parallel to the first cable for heating the fluid hose. This alternative may be used for an electrically heated device of the positive temperature coefficient (PTC) type or an electrical resistance device. A positive temperature coefficient or PTC device may also be referred to as a PTC heater or PTC resistor and is a ceramic element whose zero-power resistance increases with an increase in temperature. In the subsequent text the term "PTC device" will be used. When a PTC device is heated above a predetermined temperature by a voltage applied across it, the PTC device will auto-stabilize at a fixed temperature. If its temperature should decrease, the resistance will drop and more current is drawn to counter the cooling effect. The opposite effect occurs if the temperature increases. In addition, the performance of the PTC device is nearly independent of voltage over a relatively wide voltage range. The above features are particularly well suited for the purpose of thawing or heating a hose connector, as a predetermined temperature can be obtained even if the available supply voltage from, for instance, the vehicle batteries should vary.

Alternatively, the electrically heated device may be connected in series with the first cable for heating the fluid hose. This alternative may be used for an electric resistance heater or for an electrically heated device of the negative temperature coefficient (NTC) type. A negative temperature coefficient or NTC device may also be referred to as a NTC heater or NTC resistor and is a device whose zero-power resistance decreases with an increase in temperature. In the subsequent text the term "NTC device" will be used. The NTC device may be used alone or in combination with an electric resistance heater. When used in combination with an electric resistance heater, the NTC device may be a resistor that will experience a drop in resistance with an increase in temperature and may be embedded in the electrically heated device to control temperature. This NTC resistor may be wired to a switch, inside which is a relay that switches off the current to the electric resistance heater as a selected temperature is reached.

In the above examples, where the first cable is used for supplying electric power to the electrically heated device, the fluid hose and the first cable may be surrounded by a first external protective sheath. If the cabling arrangement is used for a vehicle of the ADR type, a typical external protective sheath may be a corrugated plastic tube of the type Polyflex® manufactured by Schlemmer Cable Protecting Systems. The choice of corrugated tube from the Polyflex®-series may vary depending on the type of use and what temperatures and/or chemical substances the tube may come into contact with. The corrugated plastic tube may preferably extend over the entire length of the fluid hose and is provided with end seals at both ends. The end seal may be an annular, relatively hard but flexible, rubber, polymer or metal washer fitted over, snapped onto or integrated with the hose connector. The corrugated plastic tube may be attached to or snapped onto said annular washer. Preferably, however, an intermediate manifold may be provided between the end seal and the corrugated plastic tube. In order to protect any electric cables supplying electric power to the fluid hose and the at least one electrically heated device for one or more hose connectors, a manifold may be provided for at least one end of the fluid hose. A typical manifold for this purpose may be a Y-manifold with a snap-lock as manufactured by Schlemmer Cable Protecting Systems®. In this case, the manifold is snapped onto said annular washer at one end and snapped over the corrugated plastic tube at its other end. The cable exiting such a manifold for connection with the electrical supply may be surrounded by an external protective sheath in the form of a corrugated plastic tube of the same type as used for the fluid hose. Adjacent an end seal where no electrical cables are introduced, a straight, tubular manifold, or 1-manifold, may be used.

According a further embodiment the first cable is used for heating the fluid hose and a second electric cable is used to supply electric power to the electrically heated device. This second cable may be integrated in the fluid hose, together with the first cable, or be arranged parallel to the fluid hose. In this case, the fluid hose, the first cable and the second cable may be surrounded by a first external protective sheath as described above. The first and second cables may be connected to the electrical supply from the end of the fluid hose remote from the hose connector to be heated.

Alternatively, either a single second cable or the first cable and the second cable are attached to the fluid hose adjacent the hose connector to be heated. The second cable may be connected to the electric supply at one end and may be provided with electrical connectors for the electrically heated device at a second end. In this case the fluid hose is surrounded by a first external protective sheath and the first cable and the second cable are surrounded by a second external protective sheath. The first and second protective sheaths may comprise corrugated plastic tubes, which are connected adjacent the hose connector by means of a manifold, as described above.

The fluid hose may also be provided with electrically heated hose connectors at both ends. In this case an electrical heating device is provided for each hose connector. The heating device may be supplied with electric power from the first cable at both ends, from the first cable at one end and the second cable at the opposite end, from a single second cable connected adjacent one end, or from a pair of separate second cables connected to each end.

In the above examples, where at least one second cable is used for supplying electric power to the electrically heated device, the heating device is preferably a positive temperature coefficient, or PTC device. However, the heating device may also be a negative temperature coefficient, or NTC device and/or an electric resistance heater. Such heaters have been described above.

According to a preferred embodiment, the heating device may be attached to the hose connector by a clip-on device.

The heating device is preferably, but not necessarily, integrated in a clip-on device attached to the hose connector. In order to protect the hose connector from ambient cold air, when the vehicle is stationary, and/or cold air is flowing past the connector, during windy conditions or when the vehicle is moving, the clip-on device is arranged to surround the hose connector on at least three sides. The clip-on device may be attached by snapping it directly onto the hose connector, onto the end seal for the corrugated plastic tube enclosing the fluid hose or onto both the hose connector and the end seal.

A clip-on device surrounding the hose connector on three or four sides may comprise a single, one-piece unit. The heating device may be attached onto one or more inner surfaces of the unit, or be integrated in the unit be, for instance, moulding. A clip-on device surrounding the hose connector on all sides may comprise two attached or separate, substantially identical halves that may be snapped on and/or screwed together. Two attached or separate and asymmetric parts may also be used. The attachment between two parts may comprise one or more flexible hinges that allow the two parts to be folded around the hose connector and be snapped and/or screwed together.

The clip-on device may also be provided with a surrounding insulating layer covering selected parts of or the entire outer surface of the device. In order to ensure insulation between a pair of mating hose connectors, the insulating layer on each facing clip-on device may be elastic and extend a short distance beyond each end surface of the respective facing clip-on devices. When the hose connectors are joined, the end of the insulating layer of each facing clip-on device will be compressed and seal any gap between the clip-on devices.

The hose connector may be formed as a substantially straight component, where the fluid conduit is arranged along an axis through the centre of the connector. Alternatively, the hose connector may be formed as an angled component. In the latter case, the section of the hose connector facing away from the fluid hose may have a fluid conduit located at an angle up to and including 90° relative to the fluid conduit extending into the fluid hose. In order to attach the clip-on device directly onto either a straight or an angled hose connector, the clip-on device may have an open U-shaped cross-section and a length substantially equal to the extension of the hose connector from the outer surface of the end seal. The width of the U-shaped cross-section may be selected to allow the clip-on device to be fitted over and in relatively close proximity to the hose connector.

The inner geometry of a clip-on device may be adapted in order to allow a single clip-on device to be used for at least two types or sizes hose connectors. For instance, if the cabling is to be used for hoses using angled hose connectors having two different angles, it is desirable to provide a clip-on device that may be fitted over hose connectors irrespective of its angle.

The clip-on device and the hose connector and/or the end seal may be provided with co-operating grooves and protrusions. If a standard hose connector is used, then the clip-on device can be arranged to be snapped onto the body of the hose connector, or to co-operate with any available circumferential grooves or protrusions. A common end seal comprises a circular disc clamped in an axial position between the hose connector and the fluid hose. Such an end seal may be provided with a circumferential groove that can be used for snapping on the clip-on device. Alternatively, the end seal may be provided with an outer circumferential profile specially adapted for co-operation with a similarly shaped clip-on device. In this way, the clip-on device may be snapped onto the hose connector and/or the end seal in a direction substantially at right angles to the axis of the fluid conduit extending into the fluid hose. A manifold may be snapped directly onto the end seal or over the clip-on device.

According to a further alternative, the end seal may be integrated with an end of the clip-on device. In this way, the clip-on device may be snapped onto the hose connector and/or the end seal in a direction substantially at right angles to the axis of the fluid conduit extending into the fluid hose. A manifold may then be snapped directly onto the clip-on device.

Clip-on devices as described above may enclose the hose connector on at least three sides, wherein an electrical heating device may be provided in at least one of the three sides. In order to connect the electrical heating device to the first or the second cable, a recess may be provided through the end seal at a suitable location to allow sufficient space for at least a pair of electrical leads.

A hose connector formed as an angled component may be provided with an alternative clip-on device. Such a clip-on device may comprise a profile with a U-shaped cross-section having a closed surface at one end and a length substantially equal to the extension of the hose connector from the outer surface of the end seal. The clip-on device and the hose connector and/or the end seal may be provided with co-operating grooves and/or protrusions. Depending on the location of the co-operating grooves and protrusions, the clip-on device may be snapped onto the hose connector and/or the end seal. By selecting the locations of the co-operating grooves and/or protrusions on the clip-on device, the device may be snapped on either in a direction substantially at right angles to the axis of the fluid conduit extending into the fluid hose, or in a direction substantially parallel to the axis of said fluid conduit. Such a clip-on device will enclose the angled hose connector on four sides, wherein an electrical heating device may be provided in at least one of the four sides. As described above, a recess may be provided through the end seal at a suitable location to allow sufficient space for at least a pair of electrical leads.

For a manifold, formed as a substantially straight component, an additional clip-on profile, having a similar U-shaped, or flat cross-section and a corresponding length may be provided. By clipping this additional profile onto the U-shaped profile as described above, the hose connector may be protected on four sides. Alternatively, a split component having two halves joined by an integrated hinge could be provided, wherein one or both halves could be provided with heating devices.

For both types manifold an alternative solution may be to integrate the end seal in the clip-on device. In order to provide a seal around entire circumference between the end seal and the manifold, a split, two part clip-on device is preferred. Suitable arrangements for split or two piece clip-on devices for surrounding the hose connector on all sides has been described above.

As an alternative to the clip-on device, the heating device may be integrated in the hose connector. This is a more expensive arrangement, as a standard hose connector can not be used. On the other hand, the through-connection of the electric cable may not require a recess through the end seal, as described above. Instead the end seal can be integrated in the hose connector, whereby a pair of electrical leads or a plug-in socket can be provided in the end surface facing the fluid hose. This solution may also require additional protection and/insulation during cold weather conditions.

As stated above, it is desirable to provide an electrically heated fluid hose with at least one hose connector having an electrically heated device that may be arranged to heat at least part of the hose connector. A common feature for all embodiments is that the heated device should be located in close proximity to, or even in contact with, the hose connector to be thawed and/or heated. The fluid hose and the electrical cable for heating the fluid hose and said at least one hose connector are preferably protected from the surrounding environment. It is also desirable to fulfil various safety requirements, such as the ADR requirements, that require all electrical cables to be completely protected, in a simple way and without expensive special components.

An advantage of providing the fluid hose with hose connectors is that the cabling can be connected to and disconnected from a fluid system in a simple way. The protective sheath comprises at least one corrugated plastic tube and at least one connector or end seal. The advantage of this is that the protective sheath can be constructed from inexpensive standard components. The advantage of arranging the said hose connector and said electrical connector separate from each other is that inexpensive standard electrical connectors and standard hose connectors can be used.

BRIEF DESCRIPTION OF DRAWINGS

In the following text, the invention will be described in detail with reference to the attached drawings. These schematic drawings are used for illustration only and do not in anyway limit the scope of the invention. In the drawings.

DETAILED DESCRIPTION

Figure 1:
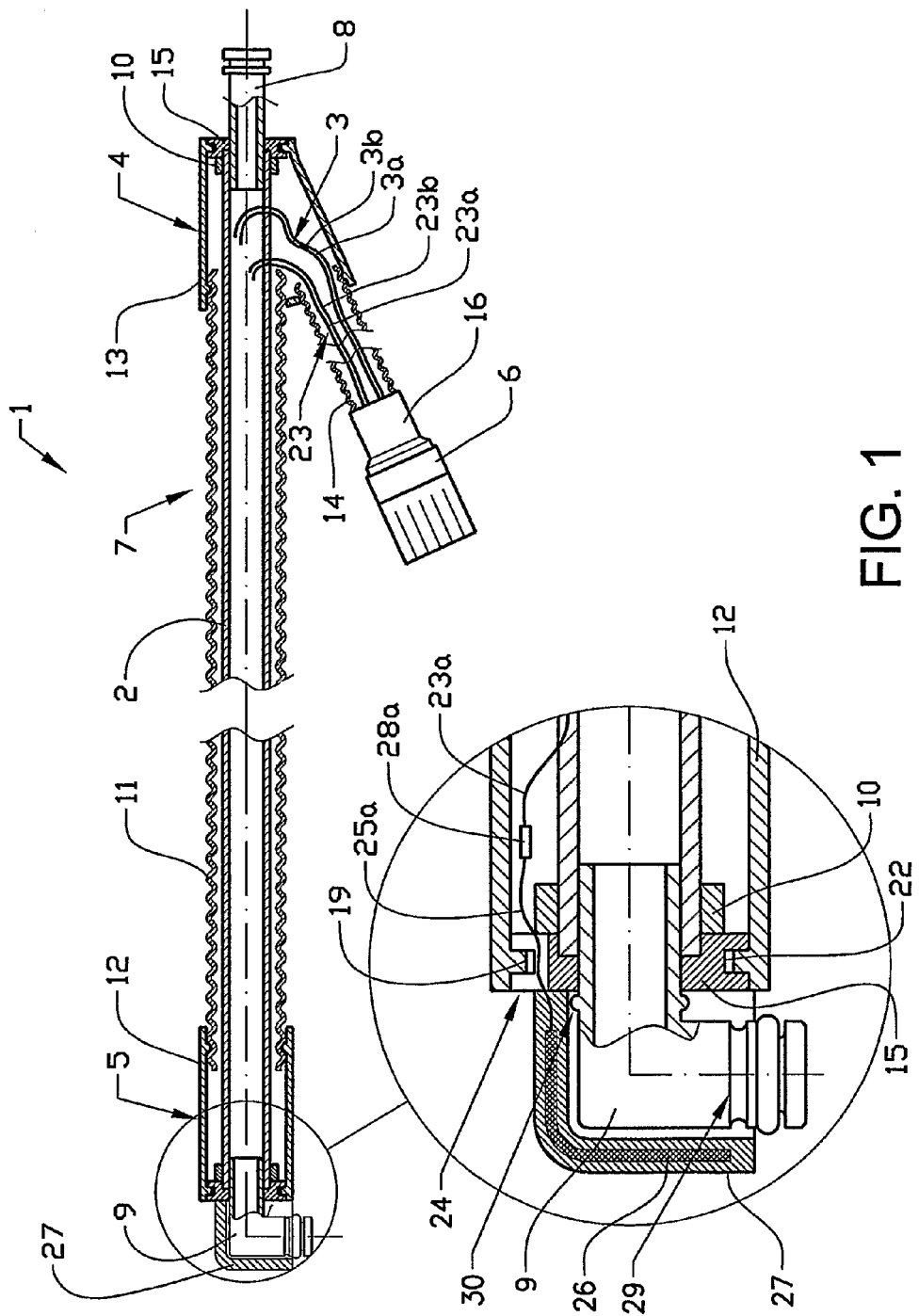
FIG. 1 shows cross section of a cabling according to a first embodiment of the invention.

The embodiments described below are merely examples and the claimed invention is in no way limited to these embodiments. In the examples, the same reference numeral has been used in each figure for the same type of component. Therefore, each component has not been described in exact detail for every example.

FIG. 1 shows a cross-section of a cabling 1 according to the invention, which cabling comprises a fluid hose 2 with an integrated heated cable 3 heating the fluid hose 2. The fluid hose 2 and the heated cable 3 are enclosed in a protective sheath 7. In this example the heated cable 3 comprises two electrical leads 3a, 3b which have been embedded in the mantle of the fluid hose 2. In a first end section 4 of the cabling 1 the heated cable 3 has been detached from the fluid hose 2, allowing the leads to be conducted to an electrical connector 6. In a second end section 4 of the cabling 1 the heated cable 3 has been detached from the fluid hose 2, allowing the leads 3a and 3b to be joined to form a closed circuit (not shown).

Instead of using embedded leads 3a, 3b it is also possible to use a separate cable attached to the outside of the fluid hose 2 or placed inside the protective sheath 7. The fluid hose 2 is made from a suitable flexible material, for instance rubber or a rubber material such as ethylene propylene diene Monomer (EPDM).

The fluid hose 2 is provided with hose connectors 8, 9 attached to the hose by means of clamping sleeves 10. The hose connector 8 and 9 respectively comprise a straight and an angled hose connector, arranged to be connected to a co-operating connector. The co-operating connectors may be further hose connectors or connectors mounted to or directly on other units for supplying or receiving fluid. Examples of such units are pumps, tanks, injectors or similar.

The protective sheath 7 enclosing the cabling comprises a system of corrugated plastic tubes and connectors therefore. The cabling 1 shown in FIG. 1 comprises a tube 11 having an inner cross-section exceeding the dimensions of the outer cross-section of the fluid hose 2. The cabling further comprises a distance piece, or 1-manifold 12, a Y-manifold 13 and a second corrugated plastic tube 14 for conducting the leads 3a, 3b to an electric connector 6. In this example, the connector 6 is a standard 4 pin DIN-connector. The tube 11 and the tube 14 have different cross-sections, as the cross-section of the leads 3a, 3b from the heated cable 3 is smaller than that of the fluid hose 2. Both the distance piece 12 and the manifold 13 are arranged to seal around their respective corrugated plastic tubes 11 and 14. In order to achieve a seal between the distance piece 12 and the manifold 13 and the fluid hose 2, each end section 4, 5 is provided with an end seal 15. In this case the end seal 15 is a circular plastic washer fitted between the end on the fluid hose 2 and a stop (not shown) on the respective hose connector 8, 9.

The outer end of each distance piece 12 and/or the manifold 13 is provided with an inner circumferential rib 19. This rib 19 is arranged to co-operate with a corresponding groove 22 in the outer circumference of the end seal 15. Similar ribs or protrusions are provided around the inner circumference of the inner ends of the distance piece 12 and the manifold 13. Each distance piece 12 and manifold 13 comprises two halves connected by integrated flexible hinges, which halves are folded around and snapped together onto one of the hose connectors 8, 9 and one end of the corrugated tube 11. When mounted, the distance piece 12 and the manifold 13 are attached to either end of the corrugated tube 11 and fixes the tube in the longitudinal direction by means of the cooperating ribs 19 and grooves 22.

FIG. 1 shows an enlarged partial view of one end of the cabling 1, comprising an angled hose connector 9 with an end seal 15 in the form of a circular washer. The end seal 15 is provided with a recess 24 for a pair of electrical leads 25a, 25b (only one shown for clarity) connected to an electrically heated device 26 attached adjacent the hose connector 9. In this example the electrically heated device 26 is a PTC element integrated in a clip-on device 27 attached to the hose connector 9. The electrical leads 25a, 25b are connected to the electrical leads 23a, 23b via electrical splices 28a, 28b adjacent the end seal 15 inside the distance piece 12. The clip-on device 27 comprises a profile with a U-shaped cross-section having a closed surface at one end and a length substantially equal to the extension of the hose connector 9 from the outer surface of the end seal 15. The clip-on device 27 can be attached to the hose connector 9 by means of protrusions or grooves (not shown) cooperating with available circumferential grooves 29 or protrusions 30 on the hose connector 9. The electrical leads 23a, 23b are embedded in the fluid hose 2 and are detached from the fluid hose 2 adjacent the first end section 4 of the cabling 3, allowing a cable 23 formed by the leads 23a, 23b to be conducted to an electrical connector 6 through the second corrugated plastic tube 14 together with the cable 3.

Figure 2:
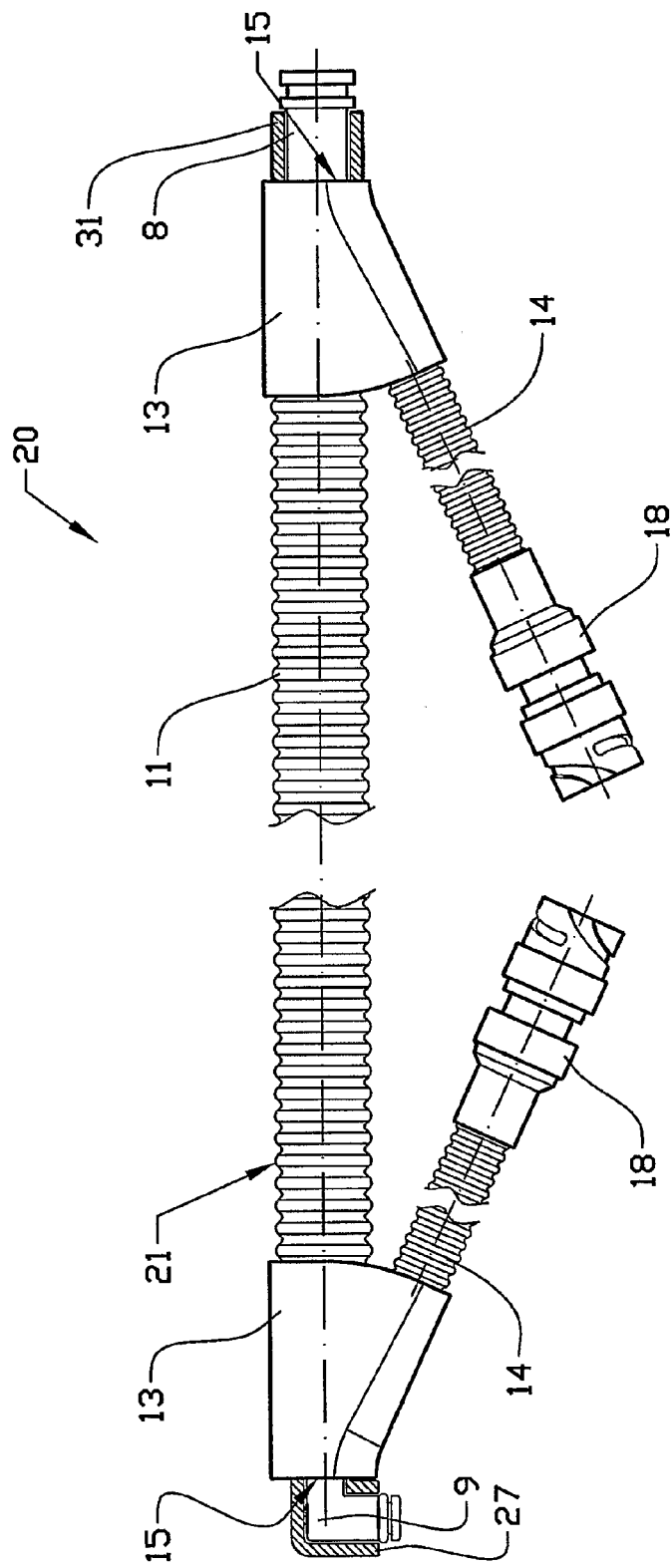
FIG. 2 shows a cabling according to a second embodiment of the invention.

A second embodiment of the invention is shown in FIG. 2. This figure shows a cabling 20 comprising substantially the same basic components as the cabling in FIG. 1, which components have retained the same reference numerals. The cabling 20 is not shown sectioned, whereby the enclosed components can not be seen. The cabling 20 comprises a fluid hose 2 having an integrated heated cable 3 for heating the fluid hose 2. The fluid hose 2 and the heated cable 3 are enclosed in a protective sheath 21. In this example the heated cable 3 is detached from the fluid hose 2 at both ends of the hose so that the respective ends of the cable 3 can be conducted to their respective electrical connector 18. The fluid hose 2 is provided with hose connectors 8 and 9 attached to the hose by means of clamping sleeves. The hose connector 8 and 9 respectively comprise a straight and an angled hose connector, arranged to be connected to a co-operating connector.

The protective sheath 21 of the cabling 20 comprises, as described in connection with FIG. 1, a system of corrugated plastic tubes and connectors. Here the protective sheath 21 includes a first corrugated plastic tube 11, two manifolds 13 and a second corrugated plastic tube 14 for conducting electrical leads to the electrical connectors 18. In order to provide a seal between the manifolds 13 and the hose connectors 8 and 9, end seals 15 are provided in each end section, as described above. An electrically heated device is attached adjacent the hose connector 9 using a clip-on device 27 is attached onto the hose connector 9. In this example the electrically heated device 26 is a PTC element integrated in the clip-on device 27. Electrical power to the heated device 26 can be supplied from either electrical connector 18, depending of the location of the main power supply and the design of the electrical system.

FIG. 2 further shows an electrically heated device for a straight hose connector 8. An electrically heated device as described above is attached adjacent the hose connector 8 using a clip-on device 31 attached directly onto the hose connector 8. The clip-on device 31 has an open U-shaped cross-section and a length substantially equal to the extension of the hose connector from the outer surface of the end seal 15. The width of the U-shaped cross-section is selected to allow the clip-on device to be fitted over and in relatively close proximity to the hose connector. The clip-on device 31 and the hose connector 8 are provided with co-operating grooves and protrusions (not shown). If a standard hose connector is used, then the clip-on device is arranged to be snapped onto the body of the hose connector. A heated device integrated in such a clip-on device would enclose the hose connector on three sides.

An additional clip-on profile, having a similar U-shaped cross-section and a corresponding length, can also be provided. By clipping this additional profile onto a U-shaped clip-on device as described above, the hose connector may be protected on four sides.

Two connectors 18 can also be used for providing electrical power to an additional circuit using one of the electrical connectors, or for supplying electrical power separately to each of the heating devices, such as a resistance wire, requiring relatively large current.

Figures 3, 4:
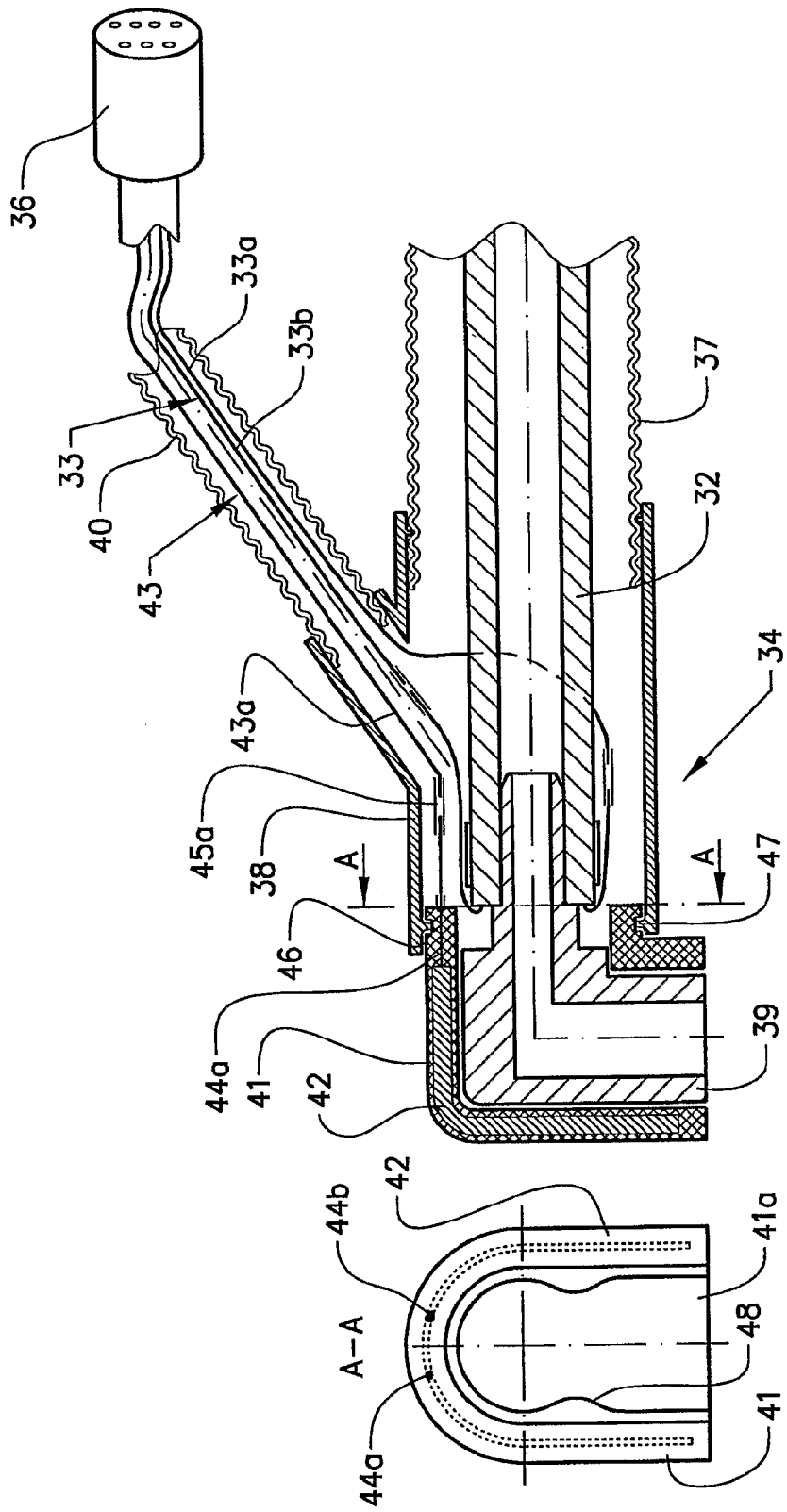
FIG. 3 shows a cross section of a cabling according to a third embodiment of the invention.
FIG. 4 shows an enlarged partial view of the embodiment of FIG. 3.

FIG. 3 shows a cross-section of a cabling according to a third embodiment of the invention. The cabling comprises a fluid hose 32 with an integrated heated cable 33 heating the fluid hose 32. The fluid hose 32 and the heated cable 33 are enclosed in a protective sheath 37. In this example the heated cable 33 comprises two electrical leads 33a, 33b which have been connected to leads embedded in the mantle of the fluid hose 32. Near a first end section 34 of the cabling the heated cable has been detached from the fluid hose, allowing the leads to be conducted to an electrical connector 36. At a second end section of the cabling the heated cable 33 has been detached from the fluid hose 32, allowing the leads 33a, 33b to be joined to form a closed circuit (not shown). At the first end section 34 of the cabling a hose connector 39 is inserted into and connected to the fluid hose 32.

The cabling further comprises a manifold 38 and a second corrugated plastic tube 40 for conducting the leads 33a, 33b to an electric connector 36. In this example, the connector 36 is a standard 7 pin DIN-connector. The tube 37 and the tube 40 have different cross-sections, as the cross-section of the leads 33a, 33b from the heated cable 33 is smaller than that of the fluid hose 32. The manifold 38 is arranged to seal around the corrugated plastic tubes 37 and 40. In order to achieve a seal between the manifold 38 and the fluid hose 32, an outer end section of the manifold 38 cooperates with a clip-on device 41 attached onto the hose connector 39. In this example an electrically heated device 42 in the form of a PTC element is integrated in the clip-on device 41. Electrical power to the heated device 26 is supplied from a cable 43 connected to the electrical connector 36.

Two electrical leads 44a, 44b (only one shown) are connected to the electrically heated device 42 attached adjacent the hose connector 39. In this example the electrically heated device 42 is a PTC element integrated in the clip-on device 41 attached to the hose connector 39. The electrical leads 44a, 44b are connected to the electrical leads 43a, 43b via electrical splices 45a, 45b (only one shown) inside the manifold 38. In this embodiment, the end seal is achieved by providing the end of the clip-on device 41 facing the manifold 38 with a groove 46 in its outer periphery. This groove 46 cooperates with an inner circumferential rib 19 on the manifold 38. The clip-on device 41 can be attached to the hose connector 39 by means of protrusions or grooves (not shown) cooperating with available circumferential grooves 29 or protrusions 30 on the hose connector 9.

FIG. 4 shows an end view of the clip-on device 41 in the section A-A. As seen in the figure, the clip-on device 41 comprises a profile with a U-shaped cross-section having a closed surface 41a at one end. The clip-on device 41 is attached to the hose connector 39 by means of generally indicated protrusions 48 cooperating with the outer circumference of the hose connector 39. The electrically heated device 42 is integrated in the clip-on device 41 on four sides and is provided with two electrical leads 44a, 44b connected to the electrical supply.

The invention is not limited to the embodiments described above, but may be varied freely within the scope of the claims. Although the above embodiments describe heated devices in the form of PTC elements, other means of electric heating, such as NTC elements or resistance wires are not excluded. The cabling may for instance be used for other applications than vehicles, where a heated hose is required to be enclosed for protection.

The invention claimed is:

1. Cabling for a motor vehicle, comprising at least one fluid hose, a first cable for heating the fluid hose and at least one electrical connector for connecting the cable to an electrical supply, and at least one hose connector for connecting the fluid hose to a cooperating connector means, the hose connector being provided with an electrically heated device arranged to heat at least part of the hose connector, wherein the first cable for heating the fluid hose and the electrically heated device are connected to the electrical supply by the same electrical connector, wherein the electrically heated device is connected in series with the first cable for heating the fluid hose, which first cable extends into the hose connector and connects to the electrically heated device arranged to heat the hose connector.

2. Cabling according to claim 1, wherein the cable connecting the electrically heated device to the electrical supply is arranged to pass through a recess in an end seal for an external protective sheath surrounding at least the fluid hose.

3. Cabling according to claim 1, wherein the electrically heated device is a negative temperature coefficient device.

4. Cabling according to claim 1 wherein the electrically heated device is an electric resistance heater.

5. Cabling for a motor vehicle, comprising at least one fluid hose, a first cable for heating the fluid hose and at least one electrical connector for connecting the cable to an electrical supply, and at least one hose connector for connecting the fluid hose to a cooperating connector means, the hose connector being provided with an electrically heated device arranged to heat at least part of the hose connector, wherein the first cable for heating the fluid hose and the electrically heated device are connected to the electrical supply by the same electrical connector, the electrically heated device is connected in parallel to the first cable for heating the fluid hose by a second cable which extends into the hose connector and connects to the electrically heated device arranged to heat the hose connector.

6. Cabling according to claim 5, wherein the electrically heated device is a positive temperature coefficient device.

7. Cabling according to claim 5, wherein the first cable is integrated in the fluid hose and the second cable is arranged parallel to the fluid hose.

8. Cabling according to claim 5, wherein the first cable and the second cable are integrated in the fluid hose.

9. Cabling according to claim 5, wherein the fluid hose, the first cable and the second cable are surrounded by a first external protective sheath.

10. Cabling according to claim 5, wherein the first cable and the second cable are attached to the fluid hose adjacent the hose connector.

11. Cabling according to claim 10, wherein the fluid hose is surrounded by a first external protective sheath and the first cable and the second cable are surrounded by a second external protective sheath.

12. Cabling according to claim 5, wherein the heating device is attached to the hose connector by a clip-on device.

13. Cabling according to claim 12, wherein the heating device is integrated in a clip-on device attached to the hose connector.

14. Cabling according to claim 5, wherein the cable connecting the electrically heated device to the electrical supply is arranged to pass through a recess in an end seal for an external protective sheath surrounding at least the fluid hose.

15. Cabling according to claim 5, wherein the electrically heated device is a negative temperature coefficient device.

16. Cabling according to claim 5, wherein the electrically heated device is a positive temperature coefficient device.

17. Cabling according to claim 5 wherein the electrically heated device is an electric resistance heater.

18. Cabling according to claim 5, wherein the heating device is attached to the hose connector by a clip-on device.

19. Cabling according to claim 18, wherein the heating device is integrated in a clip-on device attached to the hose connector.

* * * * *